United States Patent [19]

Neal et al.

[11] Patent Number: 5,489,236
[45] Date of Patent: Feb. 6, 1996

[54] FECAL LEAKAGE AND CONTAMINATION CONTROL DURING POULTRY PROCESSING

[75] Inventors: Norbert D. Neal, Cross Plains; Charles F. Cook, Middleton, both of Wis.

[73] Assignee: Oscar Mayer Foods Corporation, Madison, Wis.

[21] Appl. No.: 315,730

[22] Filed: Sep. 30, 1994

[51] Int. Cl.[6] .................................. A22C 21/00
[52] U.S. Cl. .............................. 452/176; 452/91
[58] Field of Search .................. 452/176, 120, 452/106, 116, 91

[56] References Cited

U.S. PATENT DOCUMENTS

| | | |
|---|---|---|
| 3,036,922 | 5/1962 | Saverslak . |
| 3,116,513 | 1/1964 | Ine . |
| 3,137,031 | 6/1964 | Ine . |
| 3,300,547 | 1/1967 | Gorman et al. . |
| 3,435,012 | 3/1969 | Nordlander . |
| 3,906,948 | 9/1975 | Vass . |
| 4,057,535 | 11/1977 | Lipatova et al. . |
| 4,064,107 | 12/1977 | Stackman et al. . |
| 4,654,327 | 3/1987 | Teng ............................. 514/56 |
| 4,667,370 | 5/1987 | Brockington et al. ........... 17/51 |
| 4,739,547 | 4/1988 | Simmons ........................ 17/51 |
| 4,876,767 | 10/1989 | Harben, III et al. . |
| 4,899,421 | 2/1990 | Van Der Eerden . |
| 4,924,551 | 5/1990 | Greenbank et al. ............. 452/176 |
| 5,083,975 | 1/1992 | Neal et al. ...................... 452/176 |
| 5,114,380 | 5/1992 | Larsen ............................ 452/176 |
| 5,120,266 | 6/1992 | Aubert ........................... 452/120 |
| 5,120,267 | 6/1992 | Neal et al. ...................... 452/176 |
| 5,292,278 | 3/1994 | Neal et al. ...................... 452/176 |

FOREIGN PATENT DOCUMENTS

| | | |
|---|---|---|
| 0258939 | 3/1988 | European Pat. Off. . |
| 0425106A1 | 5/1991 | European Pat. Off. . |
| WO9006685 | 6/1990 | WIPO . |

OTHER PUBLICATIONS

Biomedizinische Technik, vol. 26, No. 3, 1981, pp. 35–40; G. Grebel et al; "Klebungen am Skelettsystem: Klebstoffe, 50 Jahre Hilfsstoffe Für den Chirurgen (Teil 1)".

*Primary Examiner*—Willis Little
*Attorney, Agent, or Firm*—Lockwood, Alex, Fitzgibbon & Cummings

[57] ABSTRACT

Fecal leakage and contamination from the vent opening of an animal carcass during slaughtering and processing is reduced or eliminated by applying a curable adhesive composition to the vent opening and permitting the applied curable composition to cure to form a cured firmly adherent vent seal after de-feathering has been completed or has progressed substantially. The curable sealing compositions are safe in the fully-cured state and do not liberate undesirable materials during curing.

24 Claims, 2 Drawing Sheets

FECAL LEAKAGE AND CONTAMINATION CONTROL DURING POULTRY PROCESSING

BACKGROUND OF THE INVENTION

The present invention relates to the field of slaughtering and processing animals to provide meat products. More particularly, it relates to a new and improved method for slaughtering and processing animals including poultry such as chickens and turkeys and the like wherein leakage of fecal materials is prevented by sealing the vent of the animal with a curable adhesive to form a vent seal.

Commercial processing of freshly-killed animals is presently a multi-step process often employing various semi-automatic conveyor systems for transporting a carcass sequentially through different processing areas or stations. In the following discussion, the description concentrates on the processing of freshly-killed poultry or fowl such as chickens or turkeys, to exemplify a multi-step slaughtering and processing operation. It should be readily apparent to those skilled in the art that the description might also apply to commercial slaughtering and processing of other animals.

Commercial processing of freshly-killed fowl or poultry requires a number of steps including de-feathering the carcass of the bird and typically ending with a cleaned carcass being cut into parts suitable for cooking or with the entire carcass being preserved for cooking. More particularly, in a modern automated commercial processing plant, birds are conveyed or indexed through a plurality of consecutive work stations or areas. A typical arrangement or succession of work stations includes: a slaughtering station, whereat the throat of an invertedly suspended bird is cut and blood is permitted to drain; a scalding station, whereat the carcass is submerged in an elongate trough of heated water to facilitate de-feathering, a picking station, whereat spinning rubber fingers impact the outside of the carcass to pull out the feathers; a New York washing station, whereat the exteriors of the birds are washed down by spraying with an aqueous solution; a hock-cutting station whereat the feet are removed; and an evisceration station whereat the internal organs are removed from the remainder of the carcass.

These processing steps in commercial poultry processing operations are subject to governmental regulation and on-site inspection for health and sanitary purposes.

It is generally desirable to remove as much fecal matter or other materials as possible from the intestines of freshly killed birds or other animals at an early stage in processing the bird or animal carcasses. Fecal material remaining in the vent or intestines of the animal during processing and especially when the vent or viscera are removed, may become dislodged or is likely to leak out of the intestine or vent opening and fall into or onto the carcass, leading to rejection of that carcass by health inspectors.

Moreover, a substantial problem encountered in modern semi-automated processing equipment arises from the fact that the digestive tract organs are sometimes cut or otherwise opened during the eviscerating procedures so that ingesta or fecal material or other contents of the intestine may be released into the abdominal cavity of the bird which may lead to rejection of the bird by health inspectors. Fecal leakage onto the exterior portion of the carcass or elsewhere in the interior portions may also lead to rejection of that carcass. Possibilities for rejection are increased when it becomes necessary to comply with guidelines mandating so-called zero tolerance for contamination in animal processing, particularly poultry processing.

One prior approach to removing fecal matter involves squeezing or kneading the large intestine and cloaca of the birds to force any remaining fecal material from the bird. This is usually done manually and cannot effectively be accomplished at a rate which is compatible with the desired rates of operation of the bird conveyors in modern poultry processing facilities.

Another approach to the problem involves the use of a suction probe inserted into the vent of the bird. Loose fecal matter within the vent is supposedly withdrawn by the suction applied to the probe. Suctioning vent cleaners of the prior art have not been particularly satisfactory, however. The probes often cannot remove all the loose fecal material due to the absence of air within the vent to create an air flow for entraining the fecal matter into the suction probe. Efforts to overcome this problem by increasing the amount of suction can actually work to suck out part of the intestine itself, thereby damaging the bird, often causing fecal leakage instead of preventing it.

Water flush and suction probe apparatus have also been employed wherein water is injected into the vent area from one portion of the probe and is collected by suction in another area of the probe. The flow of water is intended to mix with any fecal materials remaining in the cloaca and intestinal tract to provide an improved level of cleaning of the interior of the bird.

A further approach is described in U.S. Pat. Nos. 5,083,975, 5,120,267 and 5,292,278. Described therein is the applying of a curable sealing composition to the vent of a slaughtered animal for controlling fecal leakage from the vent, especially before the scalding step. When the vent is sealed before scalding the poultry carcass, it is intended that it remain sealed during the subsequent de-feathering procedure. During commercial processing operations, de-feathering is carried out by mechanical pickers which exert pressure on the poultry carcass, and this has been found to cause rupturing of the gut tissue and resulting contamination, even though the vent seal remains intact.

Accordingly, to overcome the shortcomings of these processing approaches, it is an object of the present invention to provide a new and improved method for processing animals to control fecal leakage and contamination. Another object is an improved apparatus and method for preventing or substantially reducing fecal contamination that does not result in or contribute to rupturing of gut tissue during de-feathering.

SUMMARY OF THE INVENTION

In accordance with these and other objects, the present invention provides a new and improved method for processing a live animal to provide a meat product. The processing method includes the steps of slaughtering the animal and thereafter eviscerating the animal. In accordance with this invention, the improvement comprises applying an effective amount of a curable sealing composition to the vent of the slaughtered animal and curing said sealing composition to provide a cured, firmly-adherent, substantially leak-free vent seal, after de-feathering has been completed or has progressed substantially and before the eviscerating step. The substantially leak-free vent seals of the de-feathered poultry provided in accordance with the method of this invention substantially prevent or reduce leakage of fecal materials from the vent during subsequent handling and processing of the slaughtered animal carcass and are not subjected to picker forces which can rupture the tissue around the vent seals.

In accordance with this invention, the curable sealing composition may comprise a one-part or a two-part adhesive composition capable of rapidly curing, in a matter of seconds, under processing conditions employed in commercial processing plants and operations. Preferably, the curable adhesive composition will comprise a one-part composition which rapidly cures under processing conditions to form a fully cured firmly adherent vent seal which will remain effectively sealed in the vent upon being subjected to subsequent processing conditions.

Preferably, the curable adhesive sealing composition will not liberate undesired materials during the curing process and cures to a fully cured composition. Moreover, in chicken and turkey processing, the intestines or offal of the birds are frequently used after evisceration and subsequent processing for further food products, i.e., in animal feeds. For example, the offal may be removed in the evisceration step, and rendered suitable for use by washing and cooking, for example, and then be ground up and added into feed for turkeys or other uses. Accordingly, it is important that the adhesive or curable sealant used to form the cured vent seal be one that volatilizes during cooking for processing into feed or that provides a cured product which may safely be incorporated into the animal feed in small amounts. If the eviscerated offal including the adhesive vent seal, in accordance with this invention, is not going to undergo further processing for providing additional food products, greater leeway may be used in selecting the curable sealing composition for forming the curable seal.

The cure mechanism by which the curable composition cures or hardens to form the vent seal may vary from adhesive composition to composition. For example, the seal may be from an anaerobically curable adhesive or may cure upon exposure to atmospheric moisture or upon exposure to some activating energy source such as high intensity visible light or ultraviolet light.

In accordance with the preferred embodiment, cyanoacrylate curable adhesives are preferred because they have been pre-approved for surgical use in humans by governmental agencies such as the U.S. Food and Drug Administration and, in addition, they otherwise meet the requirements for the curable composition required in the method of the invention. The cyanoacrylate curable adhesives are abundantly available commercially and may be readily employed in current commercial processing plants and operations.

The curable composition for forming the vent seal in accordance with this invention, may be applied in an effective amount by any method known to those skilled in the art including dripping, dropping, brushing, coating, spraying, painting, spreading, injecting, pipetting, wicking, rolling, knifing or wiping the adhesive composition which is effective to apply a sealing amount of the curable adhesive onto or into the vent opening or anus of the animal or poultry being processed.

In accordance with the present invention, the application of the curable adhesive causes a fully-cured firmly adherent vent seal to be formed at the vent opening of the animal which prevents or eliminates the possibility of leakage of fecal material from the intestine during further processing steps and handling. The intestinal tract is sealed or closed in accordance with the present invention, until the intestine is later removed by evisceration equipment. As a result, the abdominal cavity and the remainder of the carcass remain substantially uncontaminated during processing subsequent to vent sealing after or during de-feathering.

Other objects and advantages of the present invention will become apparent from the following detailed description of the invention and illustrative examples.

BRIEF DESCRIPTION OF THE DRAWINGS

The invention will be further elucidated in the following description with reference to the drawings in which.

DETAILED DESCRIPTION OF THE INVENTION

Figure 1:
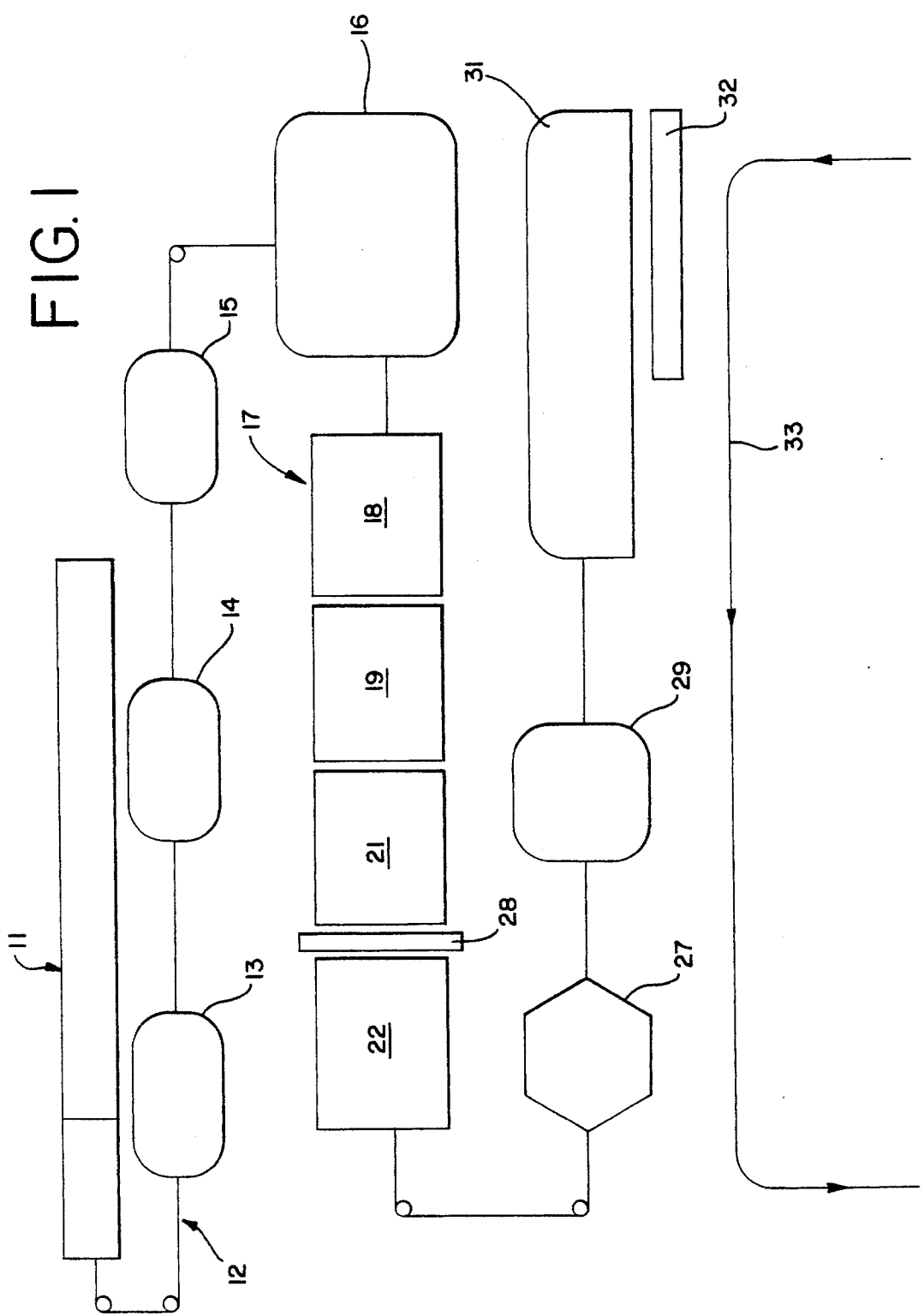
FIG. 1 is a schematic view of an apparatus or system in accordance with the present invention.

In accordance with its broadest aspects, the present invention provides a new and improved method for reducing leakage of a fecal material during slaughtering and processing of an animal which comprises gluing the vent opening or anus of the animal shut after de-feathering has been completed or has progressed beyond certain stage(s). Practice of the present method produces an intermediate animal product which comprises a slaughtered carcass having an adhesively sealed vent opening prepared for further conventional processing.

The curable adhesive composition for use in the method of the present invention must cure within very short time periods, on the order of a few seconds immediately after being applied to the vent opening or anus of the animal carcass under the temperatures and conditions frequently encountered in the slaughtering and processing environments. Varying degrees of humidity may be encountered in the processing plants, and processing environments may range in temperature from as low as 20° F. to as high as 110° F., depending on the season of the year. Accordingly, the curable sealing composition must cure to form a substantially solid, fully-cured, firmly-adherent vent seal or plug which effectively occludes the vent opening and obstructs and prevents material from the interior of the intestine or vent of the animal from leaking outwardly through or from the vent opening or anus. The cured vent seal should remain firmly adhered or adhesively bonded to the tissues forming the vent. The seal should remain intact during substantially all subsequent processing steps.

In this connection, it has been found that picker equipment can exert so much pressure on the carcass that, if the vent is sealed upstream of the pickers, the pressure build-up at the picker equipment will cause tearing or severing of the membrane material of the vent which is generally adjacent to or surrounds such a vent seal. Once this vent membrane material has been breached in such a manner, fecal material often leaks through these torn or severed locations even when the vent seal itself remains secure, which leaking typically precludes compliance with governmental guidelines mandating so-called zero tolerance for contamination in poultry processing.

Contamination due to this type of leakage which is eliminated or virtually eliminated according to the present invention can occur, for example, at the transition from the hock cutter to the rehang station and during the three pointing operation which causes pressure and subsequent leakage as the carcass is suspended from its legs and neck area. The invention eliminates contaminating throughout the rest of the evisceration process that is due to gravity or normal pressure exerted on the birds. Contamination is prevented by the invention when the poultry accumulates at rehang, during opening when making the cut for evisceration, during drawing for removing the heart and viscera, and during traditional post mortem inspection. Contamination prevention persists even during inspection of turkey carcasses from which the bung tube has been pulled and hangs loosely from the carcass and is subject to slapping against the carcass or an adjacent carcass as it is swung or rotated by an inspector. With the present invention, once the vent is sealed, contamination is possible only if the intestines are inadvertently cut or broken such as during evisceration.

The curable sealing composition may comprise a one part or two part system and may be provided in a drop-forming liquid form or in a paste form including fillers or other additives, for example.

In accordance with the preferred embodiment, the curable sealing composition comprises an anaerobic or moisture-curable cyanoacrylate adhesive composition which is liquid and may be applied in the form of drops. Anaerobic cyanoacrylate adhesive materials are commercially available and are now well known. It is believed that certain cyanoacrylate-based curable adhesive compositions are approved for use in surgical procedures where sutures are inappropriate such as in liver and spleen surgery. Cyanoacrylate adhesives may be obtained from Loctite Corporation, as well as from other commercial sources.

Illustrative anaerobic cyanoacrylate curable sealing compositions for use in the present method are described in U.S. Pat. No. 3,300,547 and U.S. Pat. No. 3,435,012, the disclosures of which are specifically incorporated herein by reference. The cyanoacrylate anaerobic adhesives are preferred at this time because they cure within seconds to form a firmly-adherent seal at the vent opening. The anaerobic cyanoacrylates do not liberate undesired materials during curing and cure to a suitably hardened solid state.

Although the cyanoacrylate adhesives may be preferred, other adhesives may meet the functional requirements required for this context of use. Other curable sealing compositions may include visible- or ultraviolet light-activatable adhesives, based on acrylates, silicones, urethanes or other polymerizable monomers. The curable sealing composition may comprise a two component composition wherein a first part of the adhesive is applied to the vent of the animal and a curing catalyst, cross-linker and/or cure accelerator, comprising the second part, to start the curing reaction. Regardless of whether a one-part or a two-part composition is used, ultimately, an in situ cured and formed vent seal is provided.

In accordance with this invention, the improvement in a processing or evisceration operation is provided by applying an effective amount of a curable sealing composition to the vent of the slaughtered animal and curing said sealing composition to provide a cured, firmly adherent, substantially leak-free vent seal. The vent seal should be formed after de-feathering and before the eviscerating step to prevent leakage of fecal materials from the vent during processing.

An effective amount of sealing composition will vary from animal to animal being processed and also will vary based upon the particular curable adhesive employed. In the case of the preferred cyanoacrylate anaerobic adhesives, an effective amount to be added may be a few drops in the case of chicken. The cured vent seal should be firmly adherent to the vent opening and the tissue sidewalls forming the vent opening. The level of bond strength or adhesion required is difficult to quantify; however, a determination of whether an effective seal has been formed can be pre-tested by manually squeezing the intestine or cloaca of the animal being processed so gasses or material contained therein press against the seal. By varying the squeeze pressure, one can qualitatively determine that the vent seal can withstand a considerable buildup of back pressure before becoming dislodged or before permitting leakage of fecal materials from the vent to occur.

If desired, the freshly slaughtered poultry can be conveyed to a vacuum or suctioning station where the vents are vacuumed by means of hand-held vacuum guns, typically prior to a de-feathering step and/or subsequent application of the curable adhesive to form the vent seal. The guns may be those described in U.S. Pat. Nos. 3,137,031 and 3,116,513 or they may be similar to those described in U.S. Pat. No. 4,876,767.

After vacuuming of the vent and lower intestine of the poultry carcass has been performed as desired, the curable sealing composition is applied to the vent opening to rapidly cure to form a firmly-adherent plug or vent seal. In the case of anaerobic cyanoacrylate adhesives, the curable sealing composition may be stored and will remain in a liquid uncured state if exposed to oxygen. Similarly, the moisture curable cyanoacrylate adhesives remain in a liquid uncured state if stored in a moisture-proof container but, upon inserting it into the vent opening of the animal carcass, being exposed to atmospheric and animal tissue moisture, it will begin a rapid curing process to form the cured seal within a matter of seconds under ordinary processing temperatures and moisture conditions encountered in current commercial poultry processing operations.

The cyanoacrylate adhesive compositions useful as the curable sealing composition will be low viscosity liquid which may be applied to the vent opening in the form of drops or it may be more actively applied through a pipetter or brush coater, sprayer or other applicator means and/or operation. It is important that the curable sealing composition be introduced or applied to the vent opening in an effective amount and in a manner so that a firmly adherent plug seal will be formed. The cured adhered seal fully occludes the vent or adhesively bonds opposing sidewalls forming the vent in a closed position which prevents or substantially eliminates the possibility for leakage of materials from the interior of the intestine onto the outside or inside of the carcass. Although droppable liquid adhesives are preferable for use in the method of the present invention, curable paste adhesives deliverable from a tube or applicator may also be useful.

In accordance with the present invention, currently used commercial systems for processing poultry may be readily modified in accordance with the apparatus aspect of this invention by providing a sealing station immediately following a de-feathering station. When the de-feathering station includes a plurality of plucking units, a sealing station according to the invention may be positioned between the plucking units, preferably downstream of the plucking units which achieve the coarser plucking operation and/or which de-feather in the general region of the vent. A sealing station typically may be safely positioned upstream of plucking units that achieve finer plucking and/or that operate upon zones of the carcass remote from the vent, such as the hock areas.

With further reference to the apparatus aspect of this invention, FIG. 1 illustrates a poultry processing line modified according to the invention. Live poultry is collected at the live dock area 11 and hung by the legs by conventional leg-gripping hooks which are conveyed along a chain-type overhead conveyor 12. Each bird is conveyed to a slaughtering line including a stun station 13 and a slaughter station 14, and blood is allowed to drain from the carcass at a bleed station 15, after which it is conveyed to a scalding station 16 to prepare the carcass for de-feathering at a plucking or de-feathering station, generally designated at 17.

Figure 2:
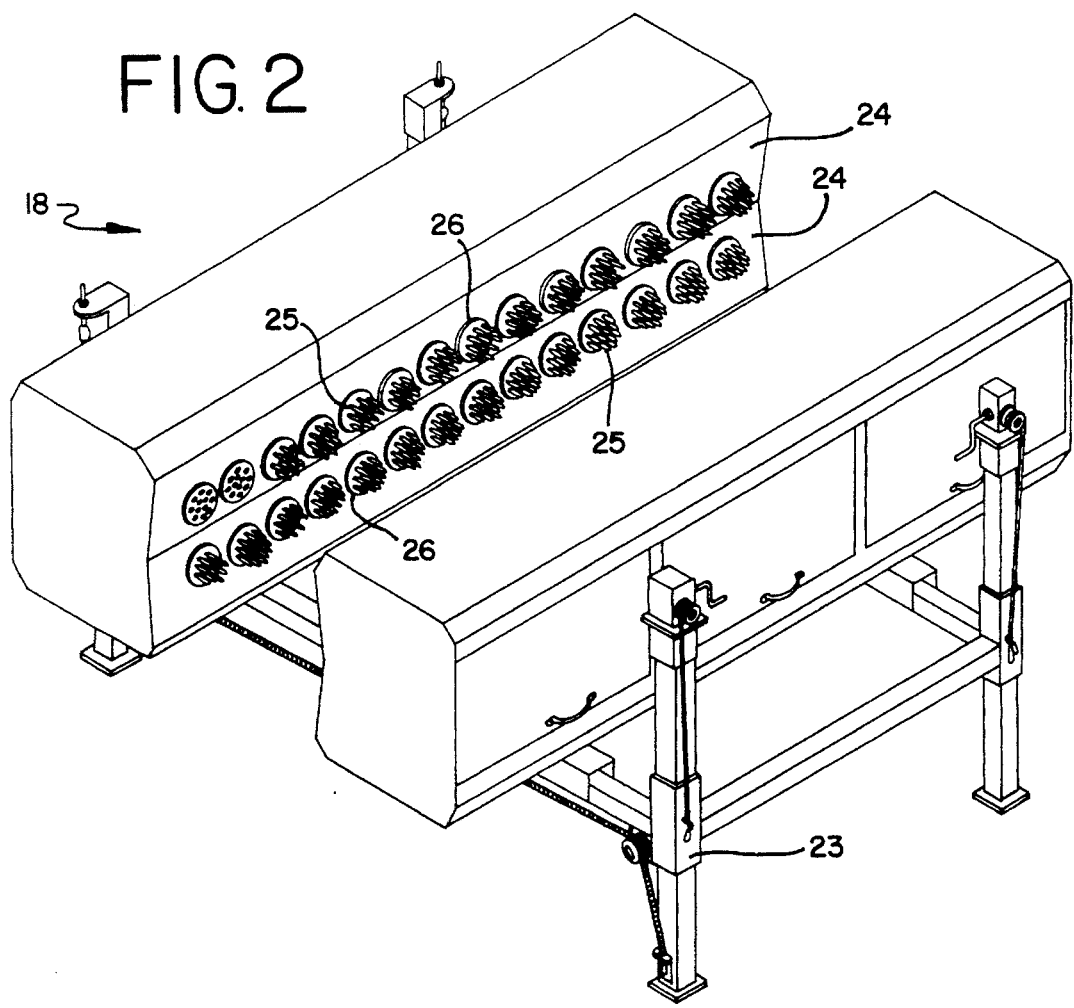
FIG. 2 is a perspective view of a style of picking or de-feathering apparatus which can be incorporated in to the present system.
Figure 3:
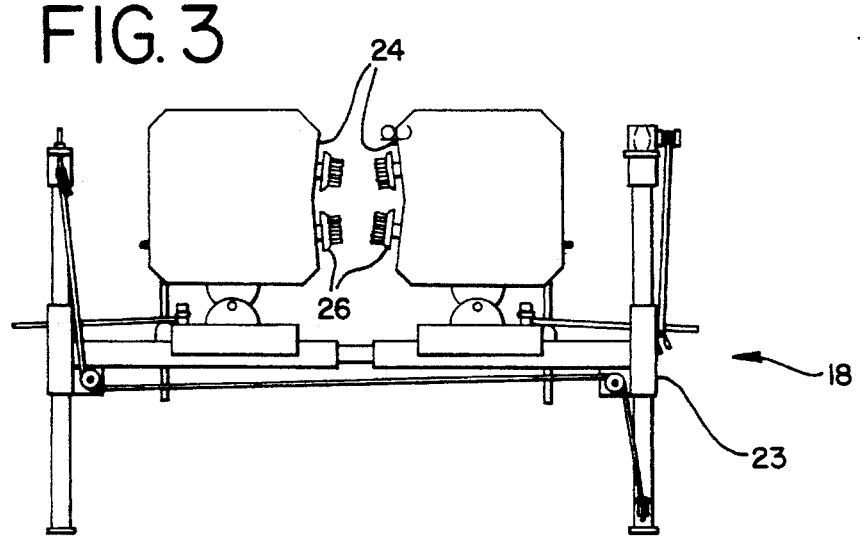
FIG. 3 is an end elevational view of the de-feathering apparatus illustrated in FIG. 2.

De-feathering station 17 can include, as illustrated, a plurality of plucker units 18, 19, 21, 22. Each plucker unit can be constructed and/or positioned to perform a different de-feathering operation on each carcass. One unit may achieve coarse de-feathering on the majority of the carcass, typically at an upstream location of the de-feathering station. Another may be positioned and structured to de-feather a specific carcass zone, such as the difficult-to-de-feather hock zone. Yet another may be at a downstream location to remove fine or residual feathers with a working approach that is relatively gentle and does not exert the intensity of pressure on the carcass as does a coarse plucking unit that applies a high level of energy to the carcass. A typical plucker unit 18 is illustrated in FIGS. 2 and 3. An adjustable frame assembly 23 allows positioning of opposing picker banks 24 to engage the desired zone of the carcass while they pass between the opposing picker banks. Rubber or flexible polymeric fingers 25 engage the carcass and rotate and/or vibrate by the movement of discs 26 within which they are mounted in order to accomplish the de-feathering operation in a manner generally known in the art. An example of a suitable plucker unit is a Model 7601 Disk Picker of Centennial Machine Company, Inc.

A sealing station 27 is shown downstream of the last plucker unit 22. A suctioning station (not shown) may be positioned upstream of the sealing station. The sealing station includes an applicator that deposits a selected number of drops of anaerobic adhesive directly at the vent area of the carcass. By this positioning of the sealing station 27, the adhesive composition is applied after completion of all of the vigorous action that is applied to each carcass by the pluckers. This eliminates the possibility that such vigorous action or movement will tear the vent membrane material even if the vent seal is undamaged by the de-feathering station 17. An alternative sealing station 28 is also shown positioned between plucker units 21 and 22. Normally, only one such sealing station would be used even when two or more plucker units comprise the de-feathering station, whether the sealing station is fully downstream of all plucker units or downstream of only some of the plucker units, which could mean only the initial plucker unit 18, Washing station 29 removes visible contamination from the thus sealed carcass, such preferably being between the de-feathering station 17 and a hock cutting station 31. After conventional three-point suspension, such as at a transfer station 32, each carcass proceeds to an evisceration line 33, followed by chillers (not shown) and, if desired, a boning line (not shown).

The invention contemplates a broad number of ways in which the curable composition may be applied to the appropriate area on the carcass by the sealing station 25, 26. The means for applying the curable adhesive may include an operator applying it by hand, for example by applying as little as two or three drops of Krazy Glue®-type, cyanoacrylate adhesive to the vent opening of the bird as the bird passes from a de-feathering station. Alternatively, mechanical and/or vision-controlled robotic arms or other automated equipment may be developed to apply the sealing composition to the vent of the bird.

As has been mentioned above, other adhesive formulations curable under processing conditions may be used in substitution for the cyanoacrylate adhesives described herein. The cyanoacrylate type adhesives were selected because they previously had obtained FDA approval in connection with surgical procedures for use with humans and were known to cure to form solid sealing materials. Although an anaerobic or moisture-curable cyanoacrylate curable adhesive formulation is mentioned, other adhesive formulations curable by other mechanisms, such as light activation, might be useful. In addition to cyanoacrylate-based adhesives, other activatable acrylate adhesives might be used, or curable silicones or urethane-based adhesives may also find application herein. Other adhesives may also include epoxidic adhesive formulations. The use of a particular adhesive will have to be tested to determine whether or not it forms a firmly adherent adhesive bond with the tissue of the vent opening to form a cured vent seal having an integrity useful for preventing fecal leakage in subsequent processing. In addition, the selection may be based on whether or not the intestines are later to be used as a component of turkey feed or in some other use which may affect the choice of materials for the curable sealant.

Each of the above mentioned patents are specifically incorporated herein by reference in their entireties.

Other objects and advantages of the present invention will become apparent from the following Example.

EXAMPLE

In this Example a manual procedure for testing the ability of a commercially available cyanoacrylate adhesive to rapidly cure to form a cured, firmly-adherent seal in a turkey processing plant under turkey processing conditions can be performed. In accordance with the method, and with reference to FIG. 1, a turkey carcass is selected for purposes of this test in a commercial turkey processing plant. In accordance with plant operation, the turkey is suspended upside down by its legs on an overhead conveyor 12 provided with leg gripping hooks. The vent opening of the turkey is disposed in an upward-facing orientation.

The turkey carcass is passed through a slaughtering station 13 wherein its throat is cut. A scalding station 14 precedes a de-feathering station 15. After de-feathering is completed in this Example, a commercially available cyanoacrylate adhesive, Krazy-Glue® brand, available over the counter from Loctite Corporation, is applied to the vent opening. The adhesive is to be applied by dropping a total of five drops onto the vent opening. The dropped adhesive will flow into the crevices of the vent and will immediately begin curing. Preferably, this procedure will be accompanied by squeezing the vent area to facilitate proper curing and sealing. The squeezing can be by manual manipulation or mechanical closing equipment. Curing will proceed for less than ten seconds to a hardened, fully cured, firmly adherent seal disposed in the vent opening.

An abdominal slit is to be made in the abdomen of the turkey, and the turkey cloaca will be squeezed by hand to apply back pressure to the cured vent seal at the vent opening of the turkey carcass. Considerable squeeze pressure can be applied and no leakage of fecal material around the cured seal will be observed. From this it can be concluded that the cyanoacrylate adhesive will form a suitable firmly-adherent seal for use in turkey processing operations which will be effective to prevent leakage of fecal material from the vent opening during processing.

Although the present invention has been described with reference to certain preferred embodiments, modifications or changes may be made therein by those skilled in the art without departing from the scope and spirit of the present invention as defined by the appended claims.

I claim:

1. In a method for processing live poultry to provide a poultry meat product including the steps of slaughtering the live poultry, scalding the slaughtered poultry, mechanically de-feathering the scalded poultry and thereafter eviscerating the de-feathered poultry, the improvement comprising applying an effective amount of a curable sealing composition to the vent of the slaughtered animal and curing said sealing composition to provide a cured, firmly-adherent substantially leak-free vent seal, said applying step being carried out only after the slaughtering step, the scalding step and at least an initial de-feathering step with mechanical pickers, said applying step being before the eviscerating step to prevent leakage of fecal materials from the vent during processing, and said carrying out of said applying step only after the de-feathering with mechanical pickers prevents rupturing of gut tissue during such de-feathering with mechanical pickers.

2. The method in accordance with claim 1, wherein said poultry is selected from the group consisting of chickens, game hens, ducks and turkeys.

3. The method in accordance with claim 1, wherein said de-feathering step has a plurality of plucking stages, and said applying step is initiated after all of said plurality of plucking stages have occurred.

4. The method in accordance with claim 1, wherein said de-feathering step has a plurality of stages, including an initial stage and final stage, and said applying step is initiated after said initial stage and before said final stage.

5. The method in accordance with claim 1, wherein said de-feathering step has a plurality of stages including an initial stage, an intermediate stage and a final stage, and said applying step is initiated after said initial and intermediate stages and before said final stage.

6. The method in accordance with claim 1, wherein said de-feathering step is carried out in a single stage, and said applying step is initiated after said single stage.

7. In a method for processing live poultry to provide a poultry meat product, said method comprising the steps of:

slaughtering the live poultry;

scalding the slaughtered poultry;

suctioning the cloaca and lower intestines of the poultry to remove fecal material;

mechanically de-feathering the poultry in at least one de-feathering stage including an initial mechanical de-feathering stage; and eviscerating the de-feathered poultry;

the improvement comprising:

sealing the cloacal vent opening in situ with a curable adhesive sealing composition before said eviscerating step and only after at least said initial mechanical de-feathering stage to prevent rupturing of gut tissue during de-feathering with mechanical pickers and to substantially prevent leakage of fecal material from the vent opening during subsequent processing.

8. The method in accordance with claim 7, wherein said de-feathering step has a plurality of plucking stages, and said applying step is initiated after all of said plurality of plucking stages have occurred.

9. The method in accordance with claim 7, wherein said de-feathering step has a plurality of stages, including said initial de-feathering stage and a final de-feathering stage, and said sealing step is initiated after said initial de-feathering stage and before said final de-feathering stage.

10. The method in accordance with claim 7, wherein said de-feathering step has an initial de-feathering stage, an intermediate de-feathering stage and a final de-feathering stage, and said sealing step is initiated after said initial and intermediate de-feathering stages and before said final de-feathering stage.

11. In a semi-automated apparatus for processing a live poultry animal to provide a poultry meat product including:

a slaughtering station having slaughtering means whereat the poultry animal is slaughtered to provide a freshly slaughtered carcass;

a scalding station having a vessel with a high temperature, aqueous scalding bath and means for submerging the freshly slaughtered bird carcass into said scalding bath to provide a scalded bird carcass;

a plucking station having at least one mechanical plucking assembly whereat the scalded bird carcass is mechanically plucked and de-feathered;

an eviscerating station including cutter means and viscera removal means whereat the plucked carcass is cut and its viscera are removed from the plucked carcass;

a washing station whereat the eviscerated carcass is rinsed and washed to provide a clean carcass; and carcass conveyor means for successively indexing the freshly slaughtered carcass from one station to the next station in the processing apparatus;

the improvement comprising:

said apparatus further including a sealing station disposed upstream of the eviscerating station and only downstream of said mechanical plucking assembly to thereby prevent rupturing of gut tissue which otherwise occurs at said plucking station when said sealing station is disposed upstream of the mechanical plucking assembly, said sealing station having applicator means for applying a curable adhesive composition to the cloacal vent opening of the carcass, the adhesive composition being curable to form a cured, firmly-adherent cloacal vent seal, whereby, leakage of fecal material from the vent opening of the carcass at downstream work stations is substantially reduced or prevented.

12. The processing apparatus in accordance with claim 11, wherein said plucking station includes a plurality of plucking units including an upstream plucking and a downstream plucking unit, and said sealing station is disposed downstream of said upstream plucking unit and upstream of said downstream plucking unit.

13. The processing apparatus in accordance with claim 12, wherein said plucking station further includes an intermediate plucking unit between said upstream and downstream plucking units, and said sealing station is between said intermediate and downstream plucking units.

14. The processing apparatus in accordance with claim 11, wherein said plucking station includes a plurality of plucking units, and said sealing station is downstream of all of said plucking units.

15. In a method for processing a live animal to provide a meat product including the steps of slaughtering the animal, mechanically de-feathering the animal, and thereafter eviscerating the de-feathered animal, the improvement comprising:

applying an effective amount of a curable sealing composition to the vent of the de-feathered animal and curing said sealing composition to provide a cured, firmly-adherent, substantially leak-free vent seal, said applying step being before the evisceration step and only after the mechanical de-feathering step to prevent rupturing of gut tissue during said mechanical de-feathering and to prevent leakage of fecal materials from the vent during subsequent processing.

16. The method in accordance with claim 15, wherein said curable sealing composition is a liquid and is applied in the form of drops.

17. The method in accordance with claim 15, wherein the method of applying the curable sealing composition in said applying step is selected from the group consisting essentially of dropping, dripping, brushing, coating, wicking, spraying, painting, spreading, injecting, rolling, pipetting, knifing and wiping methods.

18. The method in accordance with claim 15, wherein said curable sealing composition is curable in seconds after its application under processing conditions.

19. The method in accordance with claim 15, wherein said cured vent seal remains substantially leak free and intact during said evisceration step and during additional processing steps performed after said evisceration step, even upon exposure to high humidity processing conditions.

20. The method in accordance with claim 15, wherein said curable sealing composition cures to form a cured vent seal which is safe.

21. The method in accordance with claim 15, wherein said curable sealing composition comprises an anaerobic adhesive.

22. The method in accordance with claim 15, wherein said curable sealing composition comprises a cyanoacrylate adhesive.

23. The method in accordance with claim 15, wherein said live animal is a chicken.

24. The method in accordance with claim 15, wherein said live animal is a turkey.

* * * * *

UNITED STATES PATENT AND TRADEMARK OFFICE
CERTIFICATE OF CORRECTION

PATENT NO. : 5,489,236
DATED : February 6, 1996
INVENTOR(S) : Norbert D. Neal and Charles F. Cook It is certified that error appears in the above-indentified patent and that said Letters Patent is hereby corrected as shown below:

On the Cover Page, under "Other Publications", line 3, "Fur" should read --fur--.
Col. 1, line 35, "de-feathering," should read --de-feathering;--.
Col. 4, line 8, "in to" should read --into--.
Col. 5, line 47, "in situ" should be in italics.
Col. 7, line 47, "unit 18," should read --unit 18.--.
Col. 9, line 50, "in situ" should be in italics.

Signed and Sealed this

Seventeenth Day of September, 1996

Attest:

BRUCE LEHMAN

Attesting Officer

Commissioner of Patents and Trademarks